US011093586B2

(12) United States Patent
Wenker et al.

(10) Patent No.: US 11,093,586 B2
(45) Date of Patent: Aug. 17, 2021

(54) PRESENTING CONTENT PROTECTED BY MULTIPLE DRMS

(71) Applicant: Microsoft Technology Licensing, LLC, Redmond, WA (US)

(72) Inventors: Samuel John Wenker, Kirkland, WA (US); John Carl Simmons, North Bend, WA (US); Andrew Lee Jenks, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 16/209,665

(22) Filed: Dec. 4, 2018

(65) Prior Publication Data

US 2020/0117772 A1 Apr. 16, 2020

Related U.S. Application Data

(60) Provisional application No. 62/745,146, filed on Oct. 12, 2018.

(51) Int. Cl.
*G06F 21/10* (2013.01)
*G06F 21/12* (2013.01)
(Continued)

(52) U.S. Cl.
CPC .......... *G06F 21/105* (2013.01); *G06F 21/128* (2013.01); *G06F 21/602* (2013.01); *H04L 9/0819* (2013.01)

(58) Field of Classification Search
CPC .... G06F 21/105; G06F 21/128; G06F 21/602; G06F 2221/0759; G06F 21/10;
(Continued)

(56) References Cited

U.S. PATENT DOCUMENTS 8,347,404 B2 * 1/2013 Lee .................. G06F 21/10
726/29
9,697,363 B1 * 7/2017 Dorwin .............. G06F 21/62
(Continued)

FOREIGN PATENT DOCUMENTS

WO 2016156206 A1 10/2016

OTHER PUBLICATIONS

"International Search Report and Written Opinion Issued in PCT Application No. PCT/US19/054664", dated Dec. 18, 2019, 11 Pages.

*Primary Examiner* — John W Hayes
*Assistant Examiner* — Yingying Zhou
(74) *Attorney, Agent, or Firm* — Alleman Hall Creasman & Tuttle LLP

(57) ABSTRACT

Examples are disclosed related to presenting on a client device configured for a first digital rights management technology (DRM-1) content that is protected by a second digital rights management technology (DRM-2). One example provides a computing device configured to receive a request from an application for a DRM-2 license acquisition challenge, forward the request to a DRM-2 license acquisition challenge generator, receive a DRM-2 license acquisition challenge and DRM-2 state information, send the DRM-2 license acquisition challenge to the application, receive, from the application, a DRM-2 license acquisition response, generate a DRM-1 license acquisition challenge incorporating the DRM-2 license acquisition challenge, the DRM-2 license acquisition response, and the DRM-2 state information, send the DRM-1 license acquisition challenge to a remote DRM-1 license acquisition server, receive a DRM-1 license acquisition response comprising a key and a license policy, enforce the license policy for content protection, and decrypt content using the key.

19 Claims, 3 Drawing Sheets

(51) Int. Cl.
  *G06F 21/60*   (2013.01)
  *H04L 9/08*   (2006.01)
(58) Field of Classification Search
  CPC ... H04L 9/0819; H04L 9/3271; H04L 9/0822; H04L 2209/603
  See application file for complete search history.

(56) References Cited

U.S. PATENT DOCUMENTS

| | | |
|---|---|---|
| 2009/0007240 A1 | 1/2009 | Vantalon et al. |
| 2009/0119784 A1* | 5/2009 | Galuten .................. G06F 21/10 726/33 |
| 2013/0340085 A1* | 12/2013 | Nadell .................... G06F 21/10 726/26 |
| 2015/0013014 A1 | 1/2015 | Daniel et al. |

* cited by examiner

PRESENTING CONTENT PROTECTED BY MULTIPLE DRMS

CROSS REFERENCE TO RELATED APPLICATIONS

This application claims priority to U.S. Provisional Patent Application Ser. No. 62/745,146, filed Oct. 12, 2018, the entirety of which is hereby incorporated herein by reference for all purposes.

BACKGROUND

Digital rights management technologies enable playback of digital media from content providers across different platforms, as well as the provision of restrictions that limit such playback.

SUMMARY

Examples are disclosed that relate to presenting, on a client device configured for a first digital rights management technology, content that is protected by a second digital rights management technology. One example provides a computing device comprising one or more processors, and storage comprising instructions executable by the one or more processors to operate a content decryption component configured for a first digital rights management technology (DRM-1) for the presentation of content protected by a second digital rights management technology (DRM-2). The instructions are executable to receive, at a DRM-1 content decryption component of the computing device, a request from an application executing on the computing device for a DRM-2 license acquisition challenge, forward the request to a DRM-2 license acquisition challenge generator, receive from the DRM-2 license acquisition challenge generator a DRM-2 license acquisition challenge and DRM-2 state information, and send the DRM-2 license acquisition challenge to the application and locally retain the DRM-2 state information. The instructions are further executable to receive, from the application, a DRM-2 license acquisition response to the DRM-2 license acquisition challenge, generate a DRM-1 license acquisition challenge incorporating the DRM-2 license acquisition challenge, the DRM-2 license acquisition response, and the DRM-2 state information, send the DRM-1 license acquisition challenge to a remote DRM-1 license acquisition server, receive from the remote DRM-1 license acquisition server a DRM-1 license acquisition response comprising a key and a license policy for content protection, enforce the license policy for content protection, and decrypt content received via the application using the key.

Another example provides a server computing system configured to import into a first DRM technology (DRM-1) keys and policies for content protection from a second DRM technology (DRM-2). The server computing system comprises one or more processors, and storage comprising instructions executable by the one or more processors to receive, from a client computing device, a DRM-1 license acquisition challenge, extract from the DRM-1 license acquisition challenge a DRM-2 license acquisition challenge, a DRM-2 license acquisition response, and DRM-2 state information, send the DRM-2 license acquisition challenge, the DRM-2 license acquisition response, and the DRM-2 state information to a DRM-2 Key and Policy Exporter, receive from the DRM-2 Key and Policy Exporter a key and a license policy, generate a DRM-1 license acquisition response comprising the key and the license policy, and send the DRM-1 license acquisition response to the client computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
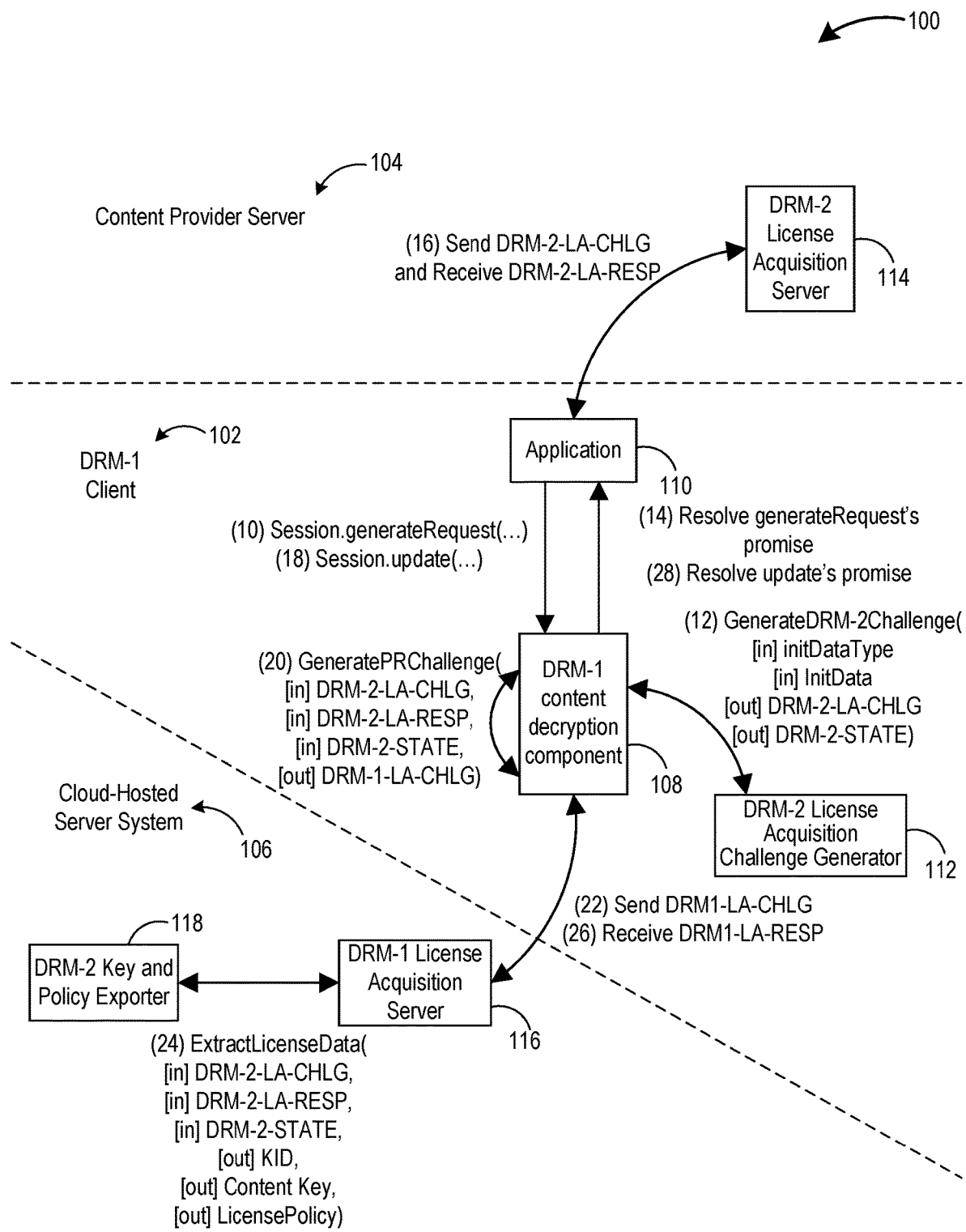
FIG. 1 shows a data flow diagram illustrating an example method of presenting, on a client device configured for a first digital rights management technology, content that is protected by a second digital rights management technology.

Digital media can be provided to consumers in various manners, including by purchase, subscription, rental and/or gifting. Playback on a digital media platform may be achieved via streaming, downloading, or sideloading. As mentioned above, digital rights management (DRM) technologies may enable a content provider or other entity to implement playback restrictions to protect proprietary content during streaming, downloading, or other transfer of digital media. For example, DRM technologies may use encryption to manage access to digital media. A key used to encrypt the digital media may itself be encrypted in a manner that restricts its use to a specific client device using a specific DRM technology, delivered to that device along with DRM technology license policy information.

Many DRM technologies are currently available, and a DRM technology may be tightly coupled to the platform on which it operates. As examples, PlayReady currently is the native DRM on Microsoft® Windows®, Widevine currently is the native DRM on Android™ devices, and FairPlay currently is the native DRM on Apple® iOS and MacOS. Although such DRM technologies may consume the same encrypted content, the manners in which the key is acquired to decrypt content and in which license policy information is stored are specific to each DRM, and are not standardized. As such, users who wish to use a variety of platforms do so by implementing a variety of DRM technologies, which may be expensive for content providers. Further, a DRM technology native to a platform provides a higher level of content protection than a DRM technology which is only part of an application running on that platform, and for a variety of business and technical reasons, there currently is no single DRM technology native to all platforms.

One possible method to play content protected by both native and non-native DRM systems on a player configured for the native DRM may utilize an atomic operation to convert a content key from one protected with a non-native DRM mechanism to one protected with the native DRM mechanism, without any portion of the key entering the clear (stored in memory, on disk, or otherwise present on the client in unprotected form) during that operation. However, this may not be feasible without the corresponding developer of each DRM having to share their source codes or algorithms used to protect their DRM-specific keys and content.

Another method may utilize a public/private key method in which a first DRM component on a client provides a public key to a second DRM component on the client. The second DRM component protects the content key with the public key provided, and sends the protected content key to the first DRM component, which may decrypt the content key with the private key of the public/private key pair. However, such a method may cause client-side key exposure, e.g. by a hacker obtaining access to the system and substituting its own public/private key.

Accordingly, examples are disclosed herein that relate to enabling clients of a first DRM technology to decrypt content protected by a second DRM technology. The disclosed examples may reduce the overhead for both DRM providers and DRM consumers by allowing a DRM license policy to be translated from one DRM technology to another DRM technology being supported by a particular platform. The disclosed examples also may allow for the targeting of multiple DRM technologies with a single DRM server, without involving any changes to the DRM license server of any DRM technologies. The disclosed examples may be implemented without a content provider changing its application, license server location, or manner in which the application packages a license request and response to and from the server. The disclosed examples further may be implemented without the sharing of any source codes or algorithms across the DRM technologies of different developers. The disclosed examples also do not reduce an existing level of security, as the key-ID, key and license policy transfer occur in a secure, trusted cloud environment, as opposed to on an untrusted client device.

FIG. 1 shows a diagram illustrating data flow within an example system 100 that enables a first DRM technology (DRM-1) client computing device to play content protected by a second DRM technology (DRM-2). More specifically, FIG. 1 shows data flow among a client computing device 102, a third-party content provider's server system 104, and a secure, trusted cloud-hosted server system 106. The content provider's server system 104 may be built on the server software development kit (SDK) for DRM-2. In this example, a content decryption component 108 (e.g. a content decryption module for HTML5 Encrypted Media Extensions (EME)) on the client computing device 102 that is configured for DRM-1 may decrypt and present content that is protected by DRM-2. Content may be presented via an application 110 executing on the client computing device 102, where the application 110 may represent any suitable application, including but not limited to EME applications.

First, at (10), the application 110 initializes a session for playback, such as in response to a user input to play content protected by DRM-2, and the application 110 generates a license request to obtain a DRM-2 license acquisition challenge. The DRM-1 content decryption component 108 receives this request, and forwards the request to a DRM-2 license acquisition challenge generator 112 on the client computing device 102. Next, at (12), the DRM-2 license acquisition challenge generator 112, with the input of initialization data and other suitable metadata, generates a DRM-2 license acquisition challenge as well as DRM-2 state information, and sends both back to the DRM-1 content decryption component 108. DRM-2 state information may contain, for example, an encrypted private key that is specific to the DRM-2 license acquisition challenge genera-tor 112. The DRM-1 content decryption component 108 receives the DRM-2 license acquisition challenge and the DRM-2 state information, sends the DRM-2 license acquisition challenge to the application 110, thus resolving the session's request at (14), and maintains the DRM-2 state information locally on the client computing device 102.

Continuing, at (16), the application 110 sends the DRM-2 license acquisition challenge to a DRM-2 license acquisition server 114 residing on the content provider's server system 104. The DRM-2 license acquisition server 114 returns a DRM-2 license acquisition response to the application 110. The DRM-1 content decryption component 108 receives the DRM-2 license acquisition response from the application 110 (e.g. via a session update process, as shown at (18)), and creates, at (20), a DRM-1 license acquisition challenge that incorporates the DRM-2 license acquisition challenge, the DRM-2 license acquisition response, and the previously stored DRM-2 state information. The DRM-1 content decryption component 108 packages DRM-2 data into DRM-1 form, while treating the DRM-2 license acquisition challenge, response, and state information as opaque objects that are copied into the DRM-1 license acquisition challenge. As such, information that is DRM-2-specific remains opaque to DRM-1.

Next, at (22), the DRM-1 content decryption component 108 sends the generated DRM-1 license acquisition challenge to a remote DRM-1 license acquisition server 116 in the secure cloud-hosted server system 106. The DRM-1 license acquisition server 116, at (24), forwards the DRM-1 license acquisition challenge incorporating the DRM-2 license acquisition challenge, the DRM-2 license acquisition response, and the DRM-2 state information to a DRM-2 Key and Policy Exporter 118, also hosted in the secure cloud-hosted server system 106. The DRM-1 license acquisition server 116 receives from the DRM-2 Key and Policy Exporter 118 a key-ID, a key, and a license policy associated with the license being requested. The key-ID may contain a globally unique identifier or other suitable identifier that is used to identify the corresponding key. The key may take the form of an Advanced Encryption Standard (AES) key, for example. The license policy may include information such as when the license expires, how many times the content associated with the license may be played, and/or any other suitable license policy information.

The DRM-1 license acquisition server 116 receives the key-ID, the key, and the license policy from the DRM-2 Key and Policy Exporter 118, at which point the DRM-1 license acquisition server 116 generates a standard DRM-1 license acquisition response comprising the key-ID, the key, and the license policy, and sends the DRM-1 license acquisition response back to the DRM-1 content decryption component 108 of client computing device 102. The DRM-1 content decryption component 108 receives the DRM-1 license acquisition response at (26), and subsequently decrypts content from the application 110 using the key, thus resolving the session's update request at (28).

The example of FIG. 1 allows a key to be securely transferred from a DRM-2 client (e.g. DRM-2 license acquisition challenge generator) protected by DRM-2 to a DRM-1 content decryption component that is protected by DRM-1, where DRM-1 and DRM-2 are developed by different DRM technology companies, and where DRM-1 and DRM-2 remain secret and opaque to each other. The disclosed system also avoids a key transfer on a client, which may be prone to malicious hacking, and instead performs the key transfer in a trusted, secure cloud environment (here illustrated as a key transfer from DRM-2 Key and Policy Exporter to DRM-2 license acquisition server).

Figure 2:
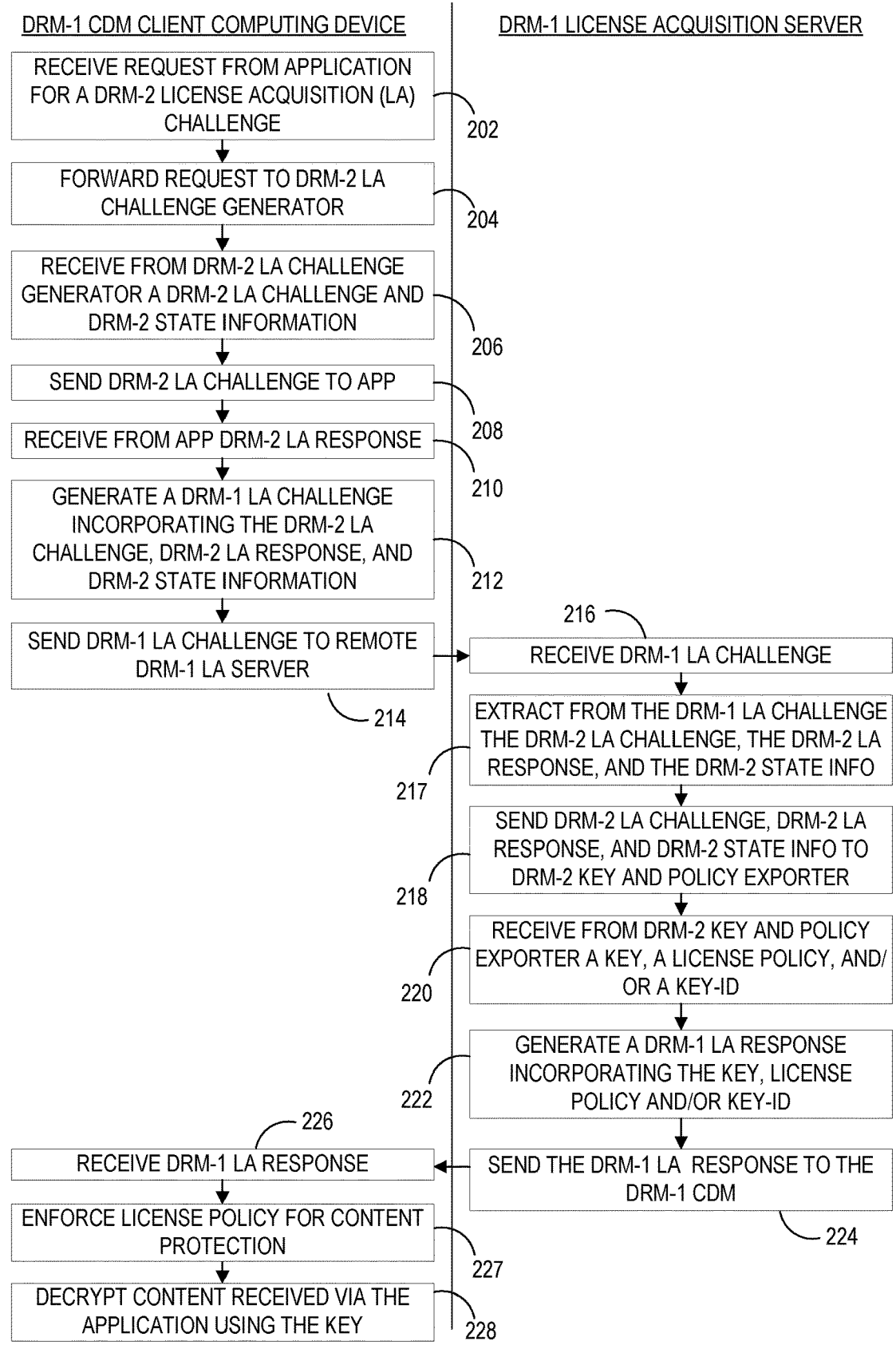
FIG. 2 shows an example method of importing, into a first DRM technology, keys and policies for content protection from a second DRM technology.

FIG. 2 shows an example method 200 of importing, into a client computing device configured for a first DRM technology (DRM-1), a key-ID, a key and license policy for content protection from a second DRM technology (DRM-2). Method 200 illustrates processes performed by a DRM-1 content decryption component on a client computing device and those performed by a DRM-1 license acquisition server hosted by a cloud service.

At 202, the DRM-1 content decryption component receives a license request from an application for a DRM-2 license acquisition challenge, and at 204, the DRM-1 content decryption component forwards the request to a DRM-2 license acquisition challenge generator. The license request may be in response to a user request to play content protected by DRM-2 at the client computing device. At 206, the DRM-1 content decryption component receives from the DRM-2 license acquisition challenge generator a DRM-2 license acquisition challenge and DRM-2 state information. As mentioned above, DRM-2 state information may include an encrypted private key associated with the DRM-2 license acquisition challenge generator. The DRM-1 content decryption component may maintain the DRM-2 state information locally and send the DRM-2 license acquisition challenge to the application, at 208.

At 210, the DRM-1 content decryption component receives a DRM-2 license acquisition response from the application, which was obtained by the application by sending the DRM-2 license acquisition challenge to a DRM-2 license acquisition server. At 212, the DRM-1 content decryption component generates a DRM-1 license acquisition challenge incorporating the DRM-2 license acquisition challenge previously received, the DRM-2 license acquisition response received from the application, and the DRM-2 state information retained locally. As mentioned above, the DRM-2 license acquisition challenge, the DRM-2 license acquisition response, and the DRM-2 state information remain opaque to DRM-1. The DRM-1 content decryption component then sends the DRM-1 license acquisition challenge to a remote DRM-1 license acquisition server, at 214.

At 216, the DRM-1 license acquisition server receives the DRM-1 license acquisition challenge, and at 217 extracts from the DRM-1 license acquisition challenge the DRM-2 license acquisition challenge, the DRM-2 license acquisition response, and the DRM-2 state information. At 218, the DRM-1 license acquisition server sends the DRM-2 license acquisition challenge, the DRM-2 license acquisition response, and the DRM-2 state information to a DRM-2 Key and Policy Exporter. The DRM-1 license acquisition server and the DRM-2 Key and Policy Exporter both reside in a same trusted, secure cloud environment. At 220, the DRM-1 license acquisition server receives from the DRM-2 Key and Policy Exporter at least a key, a license policy, and/or a key-ID, and at 222 generates a DRM-1 license acquisition response incorporating one or more of these. The DRM-1 license acquisition server then sends the DRM-1 license acquisition response back to the DRM-1 content decryption component, at 224. The DRM-1 content decryption component receives the DRM-1 license acquisition response at 226, and then enforces the license policy for content protection, at 227, and decrypts content received via the application using the key in the response, at 228. The client computing device may then play content from the application after decryption.

The disclosed examples may be implemented by a DRM-2 provider providing opaque binary code for a DRM-1 provider to install on DRM-1 clients (DRM-2 License Acquisition Challenge Generator) and in a trusted cloud environment (DRM-2 Key and Policy Exporter). In some examples, both items may take the form of modifications to an existing DRM-2 client. The disclosed examples thus may be efficiently implemented without the disclosure or sharing of source code or algorithms across the DRM technologies of different developers.

In some embodiments, the methods and processes described herein may be tied to a computing system of one or more computing devices. In particular, such methods and processes may be implemented as a computer-application program or service, an application-programming interface (API), a library, and/or other computer-program product.

Figure 3:
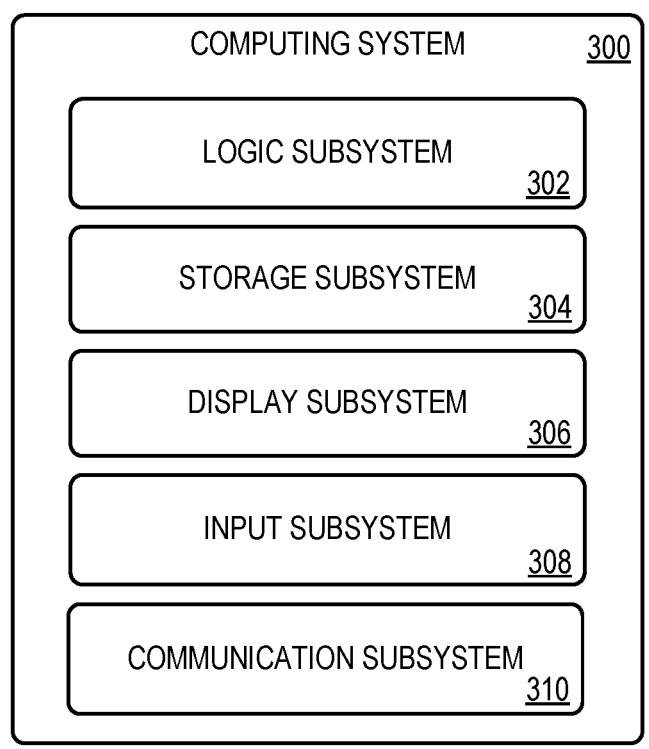
FIG. 3 is a block diagram showing an example computing system.

FIG. 3 schematically shows a non-limiting embodiment of a computing system 300 that can enact one or more of the methods and processes described above. Computing system 300 is shown in simplified form. Computing system 300 may take the form of one or more personal computers, server computers, tablet computers, home-entertainment computers, network computing devices, gaming devices, mobile computing devices, mobile communication devices (e.g., smart phone), and/or other computing devices. Computing system 300 may represent each of DRM-1 client computing device 102, DRM-1-content decryption component 108, DRM-2 license acquisition server 114, and DRM-1 license acquisition server 116.

Computing system 300 includes a logic subsystem 302 and a storage subsystem 304. Computing system 300 may optionally include a display subsystem 306, input subsystem 308, communication subsystem 310, and/or other components not shown in FIG. 3.

Logic subsystem 302 includes one or more physical devices configured to execute instructions. For example, the logic subsystem 302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 302 may include one or more processors configured to execute software instructions. Additionally or alternatively, the logic machine may include one or more hardware or firmware logic machines configured to execute hardware or firmware instructions. Processors of the logic subsystem 302 may be single-core or multi-core, and the instructions executed thereon may be configured for sequential, parallel, and/or distributed processing. Individual components of the logic subsystem 302 optionally may be distributed among two or more separate devices, which may be remotely located and/or configured for coordinated processing. Aspects of the logic subsystem 302 may be virtualized and executed by remotely accessible, networked computing devices configured in a cloud-computing configuration.

Storage subsystem 304 includes one or more physical devices configured to hold instructions executable by the logic machine to implement the methods and processes described herein. When such methods and processes are implemented, the state of storage subsystem 304 may be transformed—e.g., to hold different data.

Storage subsystem 304 may include removable and/or built-in devices. Storage subsystem 304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppydisk drive, tape drive, MRAM, etc.), among others. Storage subsystem 304 may include volatile, nonvolatile, dynamic, static, read/write, read-only, random-access, sequential-access, location-addressable, file-addressable, and/or content-addressable devices.

It will be appreciated that storage subsystem 304 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 302 and storage subsystem 304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 300 implemented to perform a particular function. In some cases, a module or program may be instantiated via logic subsystem 302 executing instructions held by storage subsystem 304. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 306 may be used to present a visual representation of data held by storage subsystem 304. This visual representation may take the form of a graphical user interface (GUI). As the herein described methods and processes change the data held by the storage machine, and thus transform the state of the storage machine, the state of display subsystem 306 may likewise be transformed to visually represent changes in the underlying data. Display subsystem 306 may include one or more display devices utilizing virtually any type of technology. Such display devices may be combined with logic subsystem 302 and/or storage subsystem 304 in a shared enclosure, or such display devices may be peripheral display devices.

When included, input subsystem 308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 310 may be configured to communicatively couple computing system 300 with one or more other computing devices. Communication subsystem 310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

Another example provides a computing device comprising one or more processors, and storage comprising instructions executable by the one or more processors to operate a content decryption component configured for a first digital rights management technology (DRM-1) to present content protected by a second digital rights management technology (DRM-2), the instructions being executable to receive, at a DRM-1 content decryption component of the computing device, a request from an application executing on the computing device for a DRM-2 license acquisition challenge, forward the request to a DRM-2 license acquisition challenge generator, and receive, from the DRM-2 license acquisition challenge generator, the DRM-2 license acquisition challenge and DRM-2 state information. The instructions are further executable to send the DRM-2 license acquisition challenge to the application and locally retain the DRM-2 state information, receive from the application a DRM-2 license acquisition response to the DRM-2 license acquisition challenge, generate a DRM-1 license acquisition challenge incorporating the DRM-2 license acquisition challenge, the DRM-2 license acquisition response, and the DRM-2 state information, send the DRM-1 license acquisition challenge to a remote DRM-1 license acquisition server, receive from the remote DRM-1 license acquisition server a DRM-1 license acquisition response comprising a key and a license policy for content protection, enforce the license policy for content protection, and decrypt content received via the application using the key. The application may additionally or alternatively include an Encrypted Media Extensions (EME) application. The application may additionally or alternatively include a web browser. The DRM-1 license acquisition response may additionally or alternatively include a key-ID. The DRM-1 license acquisition response may additionally or alternatively be provided to the remote DRM-1 license acquisition server by a DRM-2 Key and Policy Exporter. The DRM-2 state information may additionally or alternatively include an encrypted private key of the DRM-2 license acquisition challenge generator. The DRM-2 license acquisition response received from the application may additionally or alternatively be provided to the application by a DRM-2 license acquisition server.

Another example provides a server computing system configured to import into a first DRM technology (DRM-1) keys and policies for content protection from a second DRM technology (DRM-2), the server computing system comprising one or more processors, and storage comprising instructions executable by the one or more processors to receive, from a client computing device, a DRM-1 license acquisition challenge, extract from the DRM-1 license acquisition challenge a DRM-2 license acquisition challenge, a DRM-2 license acquisition response, and DRM-2 state information, send the DRM-2 license acquisition challenge, the DRM-2 license acquisition response, and the DRM-2 state information to a DRM-2 Key and Policy Exporter, receive from the DRM-2 Key and Policy Exporter a key and a license policy, generate a DRM-1 license acquisition response comprising the key and the license policy, and send the DRM-1 license acquisition response to the client computing device. The server computing system may additionally or alternatively be hosted in a cloud environment. The DRM-1 license acquisition challenge may additionally or alternatively contain a DRM-2 license acquisition challenge, a DRM-2 license acquisition response, and DRM-2 state information. The DRM-2 state information may additionally or alternatively include an encrypted private key of a DRM-2 license acquisition challenge generator. The instructions may additionally or alternatively be executable to receive from the DRM-2 Key and Policy Exporter a key-ID, and generate the DRM-1 license acquisition response further based on the key-ID.

Another example provides a computing system configured to import into a first DRM technology (DRM-1) keys and policies for content protection from a second DRM technology (DRM-2), the computing system comprising one or more processors, and storage comprising instructions executable by the one or more processors to receive, at a DRM-1 content decryption component of a client computing device for DRM-1, a request from an application executing on the client computing device for a DRM-2 challenge, forward the request to a DRM-2 license acquisition challenge generator, receive from the DRM-2 license acquisition challenge generator a DRM-2 license acquisition challenge and DRM-2 state information, send the DRM-2 license acquisition challenge to the application, and receive from the application a DRM-2 license acquisition response to the DRM-2 license acquisition challenge. The instructions are further executable to generate a DRM-1 license acquisition challenge incorporating the DRM-2 license acquisition challenge, the DRM-2 license acquisition response, and the DRM-2 state information, send the DRM-1 license acquisition challenge to a remote DRM-1 license acquisition server, receive, at the remote DRM-1 license acquisition server, the DRM-1 license acquisition challenge, send the DRM-1 license acquisition challenge to a DRM-2 Key and Policy Exporter, receive from the DRM-2 Key and Policy Exporter a key and a license policy, generate, at the remote DRM-1 license acquisition server, a DRM-1 license acquisition response comprising the key and the license policy, send the DRM-1 license acquisition response to the DRM-1 content decryption component of the client computing device, enforce the license policy for content protection, and decrypt, at the DRM-1 content decryption component of the client computing device, content received via the application using the key. The remote DRM-1 license acquisition server may additionally or alternatively be hosted in a cloud environment. The DRM-2 license acquisition challenge generator may additionally or alternatively reside on the client computing device and the DRM-2 Key and Policy Exporter may additionally or alternatively reside in a cloud environment. The application may additionally or alternatively include an Encrypted Media Extensions (EME) application. The application may additionally or alternatively include a web browser. The DRM-1 license acquisition response may additionally or alternatively include a key-ID. The DRM-2 state information may additionally or alternatively include an encrypted private key of the DRM-2 license acquisition challenge generator. The DRM-2 license acquisition response received from the application may additionally or alternatively be provided to the application by a DRM-2 license acquisition server.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
one or more processors; and
storage comprising instructions executable by the one or more processors to operate a content decryption component configured for a first digital rights management technology (DRM-1) to present content protected by a second digital rights management technology (DRM-2), the instructions being executable to
receive, at an application executing on the computing device, a request to present content protected by the DRM-2,
receive, at a DRM-1 content decryption component of the computing device, a request from the application executing on the computing device for a DRM-2 license acquisition challenge,
forward the request to a DRM-2 license acquisition challenge generator,
receive, from the DRM-2 license acquisition challenge generator, the DRM-2 license acquisition challenge and DRM-2 state information,
send the DRM-2 license acquisition challenge to the application and locally retain the DRM-2 state information at the storage of the computing device,
receive from the application a DRM-2 license acquisition response to the DRM-2 license acquisition challenge,
generate a DRM-1 license acquisition challenge incorporating the DRM-2 license acquisition challenge, the DRM-2 license acquisition response, and the DRM-2 state information by packaging the DRM-2 license acquisition challenge, the DRM-2 license acquisition response, and the DRM-2 state information into DRM-1 form,
send the DRM-1 license acquisition challenge to a remote DRM-1 license acquisition server,
receive from the remote DRM-1 license acquisition server a DRM-1 license acquisition response comprising a key and a license policy comprising a license to present the content protected by the DRM-2, the key and license being provided by a DRM-2 key and policy exporter of the DRM-1 license acquisition server,
decrypt content received via the application according to the license policy and using the key, and
output the content via the computing device.

2. The computing device of claim 1, wherein the application comprises an Encrypted Media Extensions (EME) application.

3. The computing device of claim 2, wherein the application comprises a web browser.

4. The computing device of claim 1, wherein the DRM-1 license acquisition response further comprises a key-ID.

5. The computing device of claim 4, wherein the DRM-2 state information comprises an encrypted private key of the DRM-2 license acquisition challenge generator.

6. The computing device of claim 4, wherein the DRM-2 license acquisition response received from the application is provided to the application by a DRM-2 license acquisition server.

7. A server computing system configured to import into a first DRM technology (DRM-1) keys and policies for content protection from a second DRM technology (DRM-2), the server computing system comprising:
one or more processors; and
storage comprising instructions executable by the one or more processors to
receive, from a client computing device, a DRM-1 license acquisition challenge,
extract from the DRM-1 license acquisition challenge a DRM-2 license acquisition challenge, a DRM-2 license acquisition response, and DRM-2 state information that are packaged in the DRM-1 license acquisition challenge,
send the DRM-2 license acquisition challenge, the DRM-2 license acquisition response, and the DRM-2 state information to a DRM-2 Key and Policy Exporter,
receive from the DRM-2 Key and Policy Exporter a key and a license policy, the license policy comprising a license to play a content item protected by the DRM-2,
generate a DRM-1 license acquisition response comprising the key and the license policy, and
send the DRM-1 license acquisition response to the client computing device.

8. The server computing system of claim 7, wherein the server computing system is hosted in a cloud environment.

9. The server computing system of claim 7, wherein the DRM-1 license acquisition challenge contains a DRM-2 license acquisition challenge, a DRM-2 license acquisition response, and DRM-2 state information.

10. The server computing system of claim 9, wherein the DRM-2 state information comprises an encrypted private key of a DRM-2 license acquisition challenge generator.

11. The server computing system of claim 9, wherein the instructions are further executable to receive from the DRM-2 Key and Policy Exporter a key-ID, and generate the DRM-1 license acquisition response further based on the key-ID.

12. A computing system configured to import into a first DRM technology (DRM-1) keys and policies for content protection from a second DRM technology (DRM-2), the computing system comprising
one or more processors; and
storage comprising instructions executable by the one or more processors to
receive, at an application executing on the computing device, a request to present content protected by the DRM-2,
receive, at a DRM-1 content decryption component of a client computing device for DRM-1, a request from the application executing on the client computing device for a DRM-2 challenge,
forward the request to a DRM-2 license acquisition challenge generator,
receive from the DRM-2 license acquisition challenge generator a DRM-2 license acquisition challenge and DRM-2 state information,
send the DRM-2 license acquisition challenge to the application and store the DRM-2 state information at the storage of the computing system,
receive from the application a DRM-2 license acquisition response to the DRM-2 license acquisition challenge,
generate a DRM-1 license acquisition challenge incorporating the DRM-2 license acquisition challenge, the DRM-2 license acquisition response, and the DRM-2 state information by packaging the DRM-2 license acquisition challenge, the DRM-2 license acquisition response, and the DRM-2 state information into DRM-1 form,
send the DRM-1 license acquisition challenge to a remote DRM-1 license acquisition server,
receive, at the remote DRM-1 license acquisition server, the DRM-1 license acquisition challenge,
send the DRM-1 license acquisition challenge to a DRM-2 Key and Policy Exporter,
receive from the DRM-2 Key and Policy Exporter a key and a license policy comprising a license to present the content protected by the DRM-2, the key and license policy being provided by a DRM-2 key and policy exporter of the DRM-1 license acquisition server,
generate, at the remote DRM-1 license acquisition server, a DRM-1 license acquisition response comprising the key and the license policy,
send the DRM-1 license acquisition response to the DRM-1 content decryption component of the client computing device,
decrypt, at the DRM-1 content decryption component of the client computing device, content received via the application according to the license policy and using the key, and
output the content via the computing device.

13. The computing system of claim 12, wherein the remote DRM-1 license acquisition server is hosted in a cloud environment.

14. The computing system of claim 12, wherein the DRM-2 license acquisition challenge generator resides on the client computing device and the DRM-2 Key and Policy Exporter resides in a cloud environment.

15. The computing device of claim 12, wherein the application comprises an Encrypted Media Extensions (EME) application.

16. The computing system of claim 15, wherein the application comprises a web browser.

17. The computing system of claim 12, wherein the DRM-1 license acquisition response further comprises a key-ID.

18. The computing system of claim 12, wherein the DRM-2 state information comprises an encrypted private key of the DRM-2 license acquisition challenge generator.

19. The computing system of claim 12, wherein the DRM-2 license acquisition response received from the application is provided to the application by a DRM-2 license acquisition server.

* * * * *